United States Patent
Ching

[11] Patent Number: 6,123,508
[45] Date of Patent: Sep. 26, 2000

[54] FLUID LEVEL INDICATOR

[75] Inventor: Angel Ching, Montebello, Calif.

[73] Assignee: Barksdale, Inc., Los Angeles, Calif.

[21] Appl. No.: 09/460,665

[22] Filed: Dec. 13, 1999

[51] Int. Cl.[7] ................................................. F04B 49/04
[52] U.S. Cl. ...................... 417/40; 169/DIG. 1; 73/322.5
[58] Field of Search ................. 417/40, 41; 169/DIG. 1; 73/322.5

[56] References Cited

U.S. PATENT DOCUMENTS

| | | | |
|---|---|---|---|
| 3,442,219 | 5/1969 | Fitzgerald | 103/26 |
| 3,829,636 | 8/1974 | Scott | 200/34 |
| 3,963,376 | 6/1976 | Miskin | 417/40 |
| 4,081,639 | 3/1978 | Tice | 200/84 C |
| 4,441,860 | 4/1984 | Tsujimoto | 417/40 |
| 4,805,066 | 2/1989 | Mergenthaler | 361/178 |
| 4,943,210 | 7/1990 | Bailey, Jr. et al. | 417/12 |
| 5,155,311 | 10/1992 | Utke | 200/84 |
| 5,562,422 | 10/1996 | Ganzon et al. | 417/40 |
| 5,586,466 | 12/1996 | Steiner | 73/319 |
| 5,900,546 | 5/1999 | Wilkins | 73/290 V |

Primary Examiner—Charles G. Freay
Assistant Examiner—Robert Z. Evora
Attorney, Agent, or Firm—Leon D. Rosen

[57] ABSTRACT

Apparatus is provided for indicating when the water level rises to a predetermined height, of the type that includes a float assembly (44) with a float that rises along a guide of a fixed housing assembly (40) until an activator (74) on the float assembly activates a switch (70) on the housing assembly. The guide is in the form of a downwardly-extending post (42), and the float assembly includes a hollow shaft (52) that extends upwardly from the float and that surrounds the post. As a result, the sliding surfaces (60, 62) along which the float assembly slides upwardly along the post, is isolated from the environment to ensure reliable sliding despite a hostile environment that could damage any exposed sliding surfaces and prevent reliable sliding.

7 Claims, 2 Drawing Sheets

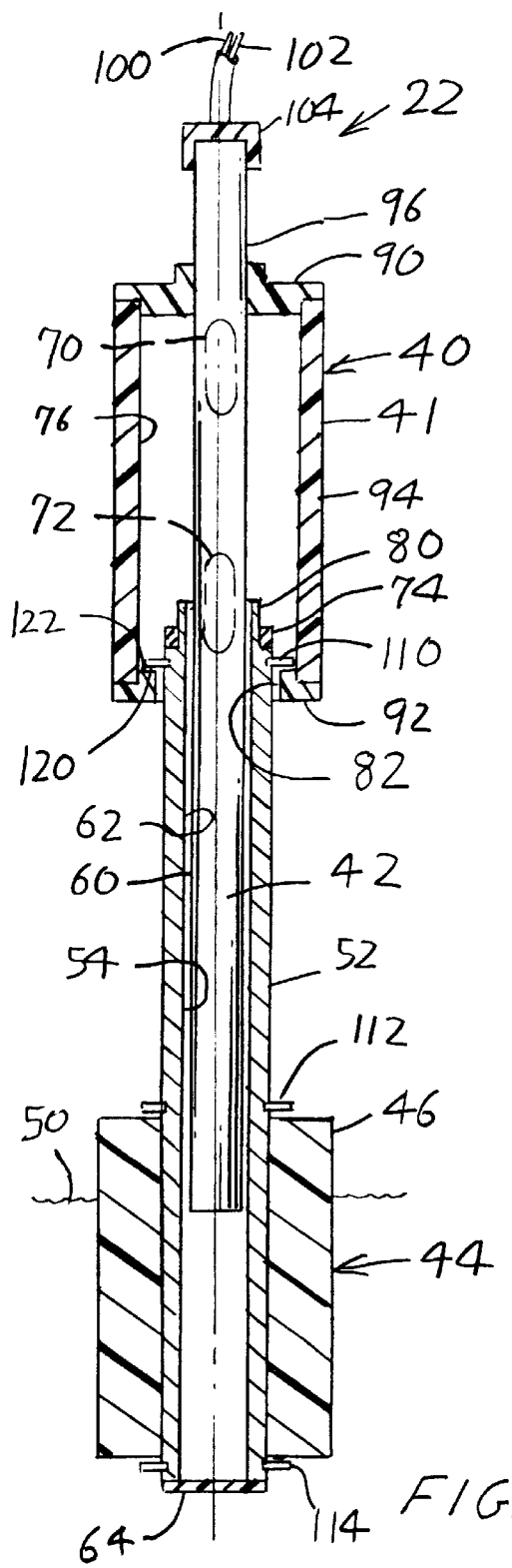
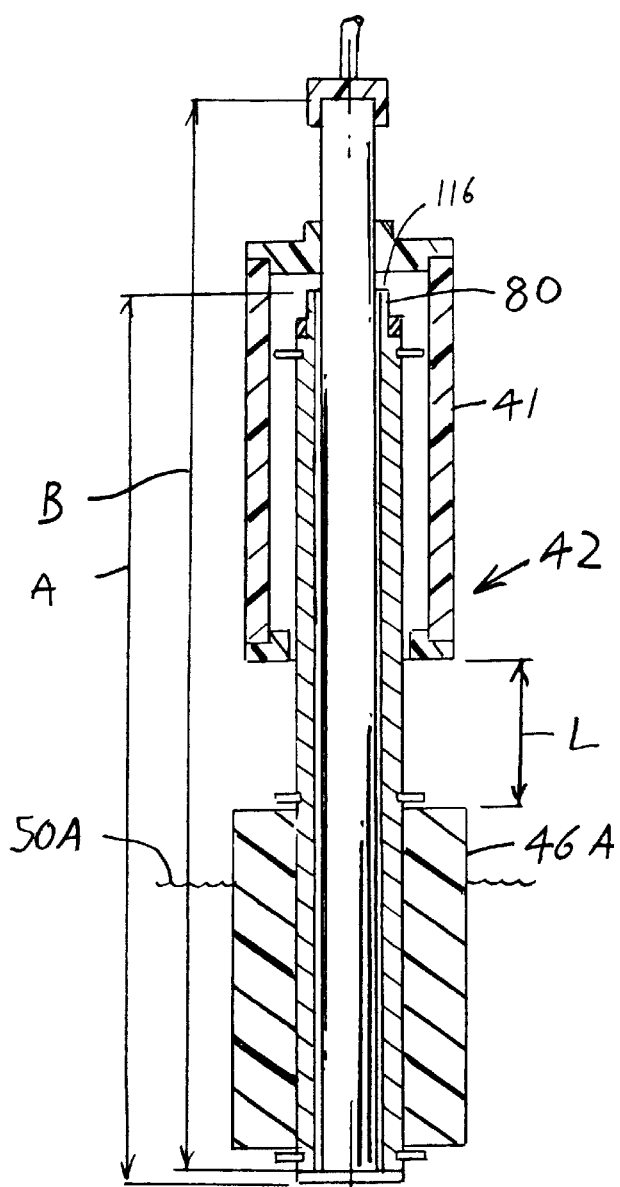

FLUID LEVEL INDICATOR

BACKGROUND OF THE INVENTION

Level indicators are commonly used to indicate when the level of fluid has reached a predetermined high level, and usually to also indicate when the level of fluid has reached a predetermined low level. For example, fluid may be pumped or released from a container or no further fluid allowed to enter the container, when the high level is reached. One common use for such level indicators is in underground utility vaults, where a pump is energized to pump water out of the vault when the water level reaches a predetermined height, to prevent immersion of equipment in water. Also, when the water level falls to a low level, the pump is turned off until the water level rises to the high level again.

One type of level indicator includes a fixed housing in the form of a vertical post, with a pair of vertically spaced reed switches that can be activated by a magnet. A float has a hole that receives the post, the float carrying a magnet for activating the switches. When the float rises to a high level, its magnet reaches a position adjacent to the upper switch to activate it, while when the float moves down, its magnet reaches a position adjacent to the lower switch to activate it. The sliding surfaces located at the outside of the post and the inside of the hole that extends through the float, are exposed to the environment. When the float reaches its high level, water covers the lower portion of the post. Chemicals in the water, especially calcium carbonate, can precipitate out of the water, and coat the post and the inside of the float vertical hole. Such coatings can prevent the float from sliding along the post, and result in malfunction with harmful consequences. In the case of underground utility vaults, the water that seeps into the vault, may carry a high percentage of minerals that can precipitate out, due to the water having leached out such chemicals as it migrated through the soil, the concrete walls of the vault, etc. A level indicator of simple construction whose reliability remained high despite the presence of liquid around it which contained chemicals that easily precipitated out of the liquid, would be of value.

SUMMARY OF THE INVENTION

In accordance with one embodiment of the present invention, a level indicator is provided, which is of a design similar to the well-accepted prior art designs but wherein the sliding surfaces, along which the float assembly slides with respect to a guide, are isolated from the liquid whose level is being indicated. The float assembly includes a housing with a fixed guide, while the float assembly includes a float and a shaft that extends upwardly from the float and that is slideably guided by the guide. The shaft is preferably hollow, and the guide is preferably in the form of a post that extends downwardly from a housing and that lies within the hollow shaft.

The novel features of the invention are set forth with particularity in the appended claims. The invention will be best understood from the following description when read in conjunction with the accompanying drawings.

BRIEF DESCRIPTION OF THE DRAWINGS

FIG. 4 is a sectional side view of the level indicator of FIG. 3, with the float in its lowest position.

FIG. 5 is a sectional view similar to that of FIG. 4, but with the float in its highest position.

DESCRIPTION OF THE PREFERRED EMBODIMENTS

Figure 1:
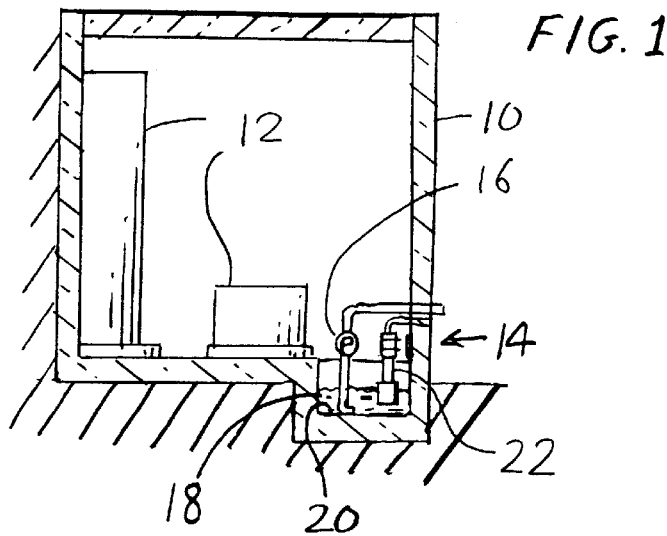
FIG. 1 is a sectional view of an underground utility vault, and showing a system for limiting the rise of water in the vault with the system including a level indicator of the present invention.
Figure 3:
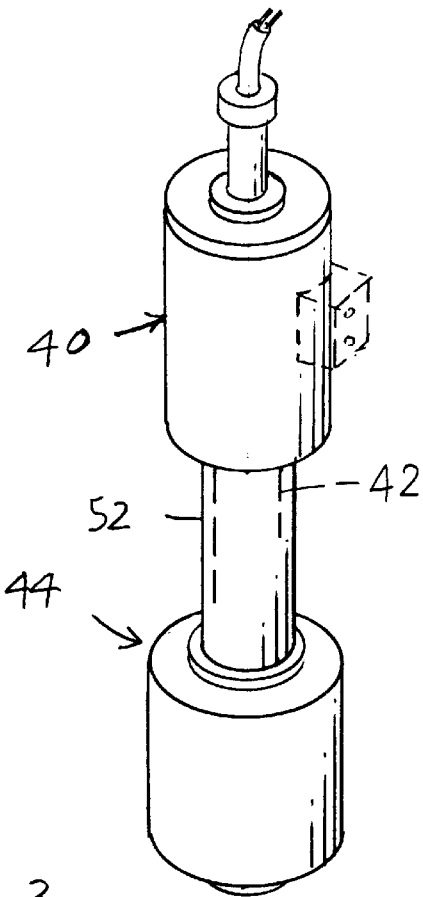
FIG. 3 is an isometric view of a level indicator of the present invention.

FIG. 1 illustrates an underground utility vault 10, which is used to hold equipment 12 at a level below the surrounding level of the earth. Water can seep into the vault, and a system 14 is provided to prevent the equipment 12 from becoming immersed in the water. This system includes a pump 16 that pumps liquid 18, which is usually primarily water with a high concentration of minerals, out of a container 20 that is provided to accumulate water. The system includes a level indicator apparatus 22 which lies in the environment within the container. The apparatus is used to sense when the water has risen to a high level near the top of the container 20 to turn on the pump 16, so water in the container 20 of the vault is quickly pumped out. The pump has a capacity sufficient that the water in the container 20 is rapidly pumped out. When the water level falls to a low level, the apparatus 22 generates another signal to turn off the pump, to avoid wearing out the pump.

Figure 2:
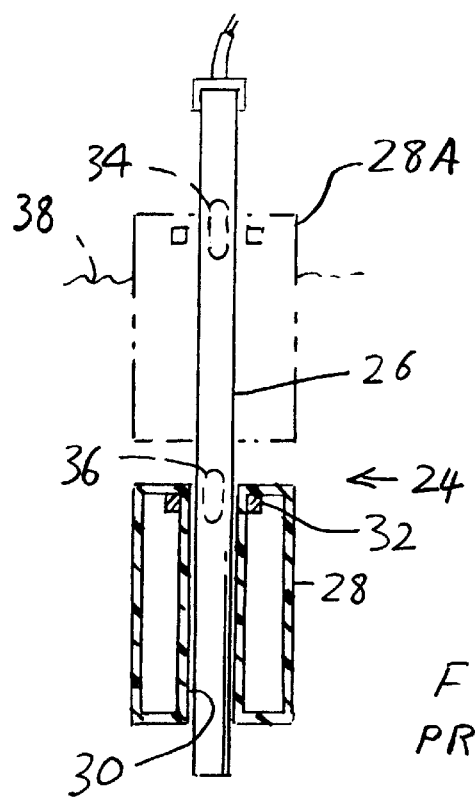
FIG. 2 is a side elevation view of a level indicator of the prior art, with the float shown in its lowest position in solid lines, and with the float shown in its highest position in phantom lines.

FIG. 2 illustrates a prior art level indicator 24 which was used to turn on and off the pump. The prior level indicator included a guide in the form of a vertical post 26, and a float 28 with a hole at the center that received the post 26. When the float 28 rose to the level 28A, a magnet 32 on the float moved to a position adjacent to an upper activatable switch 34 on the post, to operate that switch. When the float moved down again to the position 28, the magnet 32 moved to a position adjacent to a lower switch 36 to activate that switch. One of the problems encountered with the prior level indicator 24 is that the outer surface of the post 26 and the surface formed by the hole 30 in the float, both became covered with minerals deposited by the fluid in which the float lay. This was especially true when the water rose to the level 38. The deposited minerals could prevent the float from readily sliding along the post. This could result in the pump not being operated to pump out the water from the container when it reached a high level, or in the float not moving down when the water was pumped out resulting in the pump being continually energized until it failed.

FIG. 4 illustrates a level indicator apparatus 22 of the present invention, which is an improvement over prior art level indicators. The apparatus 22 includes a housing assembly 40 with a housing 41 that can be fixed to the walls of a container in which fluid accumulates, and a guide 42 that is fixed (against substantial vertical movement) to the housing and that extends downwardly from the housing. A float assembly 44 includes a float 46 that floats on the liquid at the level 50 of the liquid surface, and a vertically-extending shaft 52 that extends upward from the float and that is slideable along the guide 42. In particular, the shaft 52 is hollow, with a vertical bore 54 that receives the guide 42 that is in the form of a post.

The outside of the guide has a sliding surface 60 that slides within a sliding surface 62 formed at the inside of the shaft along the bore 54. The sliding surfaces 60, 62 are isolated from the environment to resist contact with the fluid such as water in which the float lies, so minerals in the fluid are not deposited on the sliding surfaces 60, 62. This assures much greater reliability of sliding of the float assembly with respect to the housing assembly with its guide 42.

Even if the shaft 52 were to slide within a hollow guide 42, the presence of an upwardly-extending shaft enables the engaged sliding surfaces to lie above the highest level of the float, which is usually a small distance above the highest level that water rises in the container surrounding the apparatus. This construction would result in static water not lying around the sliding surfaces. However, water that is splashed or that drips and moves down along the parts, could still contaminate the sliding surfaces. Applicant's use of a hollow shaft 52 that surrounds the guide 42, results in the sliding surfaces 60, 62 being isolated even from splashed water, such as might occur when the pump is suddenly turned on or from other causes. Applicant provides a bottom cap 64 that seals that bottom of the hollow shaft 52 to isolate the sliding surfaces from the fluid. It would be possible to provide sliding surfaces only above the highest water level, at 50A in FIG. 5, but this would result in a taller apparatus or one with less length of sliding engagement.

The post or guide 52 is actually hollow, and contains a first activatable switch 70 and a second activatable switch device 72, that are both located within the housing 41. A switch activator 74 in the form of a magnet, activates whichever switch 70, 72 that it lies adjacent to. Usually, a switch is activated when the magnet 74 surrounds the switch.

Applicant places the upper end 80 of the hollow shaft within the chamber 76 formed by the housing 42. As a result, throughout the movement of the float assembly between the lowest position shown in FIG. 4 and highest position shown in FIG. 5, the upper end 80 of the shaft is always within the housing 42. This prevents the dripping of water down through the upper end of the shaft to the sliding surfaces 60, 62. The housing has a hole 82 at its lower end through which the hollow shaft slides, and there is a small possibility that water could splash through the opening 82. However, it is unlikely that any such splashed water would find its way to the upper end 80 of the shaft to dribble down along the shaft. As a result, a drain hole is generally not required in the bottom cap 64. The guide 42 is preferably formed of a material that resists the condensation of moisture thereon, since such moisture could be harmful even though it does not contain a significant amount of minerals.

The housing 42 has a top wall 90, a bottom wall 92, and side walls 94 extending between them. The upper end 96 of the guide post 42 is mounted on the top wall 90 of the housing. This allows the upper end 80 of the shaft to always lie within the housing. Wires such as 100, 102 that extend from the switch and switch device 70, 72, extend up through a cap 104, into a circuit (not shown) that controls the pump or other apparatus.

Three snap rings 110, 112, and 114 are installed on the shaft 52. The upper snap ring 110 has a downwardly-facing shoulder 120 that limits downward movement of the float assembly when the snap ring lies on an upwardly-facing surface 122 of the bottom wall 92 of the housing. The middle snap ring 112 prevents upward movement of the float 46 along the shaft 52. The lower snap ring 114 prevents the float from moving down off the shaft. The extreme top 116 of the shaft forms a shoulder that limits upward movement of the float assembly, although the float 46 also performs this function. It is possible to allow the float 46 to turn with respect to the shaft 52, but the float cannot move more than a small amount vertically with respect to the shaft. Although the float 46 is shown as constructed of a solid hollow cylinder of a lightweight plastic, it could be filled with air or another lightweight material.

The level indicator apparatus 22 can be readily assembled by inserting the shaft 52 through the float 46 and installing the two snap rings 112, 114. Then, the housing 41, with the top wall 90 not yet in place, is dropped around the top of the shaft 52. With the upper end 80 of the shaft projecting above the top of the housing side wall 94, the upper snap ring 110 is installed. Then the top wall 90 is moved down against and sealed to the side wall 94 of the housing. The guide post 42 is installed to the position shown and sealed to the top wall 90. This assembly procedure results in a length L (FIG. 5) of shaft 52 being provided, which extends between the bottom of the housing 41 and the top of the float at 46A in its uppermost position.

In a level indicator apparatus in the construction shown in FIGS. 4 and 5 that applicant has designed and successfully tested, the height A of the float assembly 44 is 4.51 inches, while the height B of the housing assembly is 5.48 inches. The distance L is 0.75 inch which is more than 10% of the height of the height A of the shaft. FIGS. 4 and 5 are accurate depictions of the float.

Thus, the invention provides apparatus for indicating when the level of liquid in a container has risen to a predetermined height, which includes a float assembly that can slide up and down with respect to a housing assembly, wherein the sliding surfaces are isolated from the fluid in which the float of the float assembly rises and falls. The float assembly includes a vertically extending shaft that extends upwardly from the float and that is slideably guided by the guide. The shaft is preferably a hollow shaft, and the guide is preferably a post that extends downward from the housing and that is received within the hollow shaft, so the sliding surfaces can lie within the shaft. The top of the shaft preferably lies within a chamber formed by the housing, at all positions of the shaft.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for indicating when the level of liquid in a container has risen to a predetermined height, comprising:

a housing assembly which can be fixed to said container, said housing assembly including a housing and a guide;

an activatable switch mounted on said housing assembly, with said switch activatable when the liquid reaches said predetermined height;

a float assembly that is vertically moveable with respect to said housing assembly along said guide, said float assembly carrying a switch activator that activates said switch when said assembly has moved up to a predetermined height;

said float assembly includes a float that is buoyant in said fluid, and a vertically extending shaft that extends upwardly and through said float and with the bottom of the shaft being closed and that is slideably guided by said guide, said shaft being substantially fixed to said float.

2. The apparatus described in claims 1 wherein:

said guide comprises a vertically-extending post with an upper end mounted on said housing and with a free lower end;

said shaft is a hollow shaft that receives said post to slide around said post, whereby to provide isolated sliding surfaces where said shaft slides with respect to said post.

3. The apparatus described in claim 2 wherein:

the bottom of said hollow shaft is sealed from the surrounding environment.

4. The apparatus described in claim 2 wherein:

said housing has top, bottom, and side walls, with said post extending down from substantially said top wall and through said housing and below said bottom wall;

said hollow shaft has an upper end that lies within said housing and that has shoulders that lie between said top and bottom walls of said housing at all vertical positions of the float assembly.

5. The apparatus described in claim 4 including:

an activatable second switch device mounted on said housing at a location below said activatable switch, with said switch activator being constructed to activate said switch when said float reaches said predetermined height and to activate said second switch device when said float moves down to a low level that is below said predetermined height.

6. Apparatus for indicating when the level of liquid in an environment reaches a predetermined upper level, which includes a housing that can be mounted at a fixed level in said environment, a switch mounted on said housing, a guide mounted on said housing, and a float assembly that is vertically moveable with respect to said guide and that carries a switch activator that activates said switch when said float assembly rises to a predetermined level that corresponds to said predetermined upper level, wherein:

said float assembly includes a float and a sleeve that is narrower than said float and extends upwardly that is attached to said float to move vertically with said float, said guide being in the form of a post with said post being received in said sleeve to allow said sleeve to move up and down around said post.

7. The apparatus described in claim 6 wherein said apparatus is constructed to indicate when said liquid reaches a lower level that is below said upper level, and wherein:

said housing has top, bottom, and side walls, with said post mounted on said top wall and extending down through said housing and along a distance below said bottom wall of said housing;

said sleeve has an upper end that lies within said housing, said sleeve upper end having a shoulder positioned above said bottom wall to prevent said sleeve from moving down out of said housing.

* * * * *